United States Patent
Emi

[19]

[11] Patent Number: 6,047,018
[45] Date of Patent: Apr. 4, 2000

[54] MULTI-CARRIER COMMUNICATION METHOD AND DEVICE

[75] Inventor: Tetsuichi Emi, Inashiki-gun, Japan

[73] Assignee: Sanyo Electric Co., Ltd., Osaka, Japan

[21] Appl. No.: 08/935,555

[22] Filed: Sep. 23, 1997

[30] Foreign Application Priority Data

Sep. 30, 1996 [JP] Japan .................................. 8-259441

[51] Int. Cl.$^7$ .................................................. H04B 15/00
[52] U.S. Cl. .......................... 375/202; 375/267; 370/206; 455/76
[58] Field of Search ..................... 375/200, 201, 375/202, 254, 285, 296, 303, 267; 370/319, 330, 335, 337, 342, 347, 441, 203, 206, 344; 455/102, 113, 76

[56] References Cited

U.S. PATENT DOCUMENTS

| | | | |
|---|---|---|---|
| 5,548,582 | 8/1996 | Brajal et al. ............................. | 370/206 |
| 5,870,391 | 2/1999 | Nago ....................................... | 370/330 |
| 5,907,545 | 3/1999 | Arai et al. ............................... | 370/342 |

FOREIGN PATENT DOCUMENTS 9064923   3/1997   Japan .

OTHER PUBLICATIONS

John Bingham, "Multicarrier Modulation for Data Transmission: An Idea Whose Time Has Come," IEEE Communication Magazine, pp. 5–14, May 1990.

Eimatsu Moriyama, et al. "Configuration and Basic Performance of Advanced Frequency–Hopping Spread Spectrum Communication Equipment for Land Mobile Radio", vol. 32, No. 164, pp. 165–177.

D.J. Goodman, et al. "Frequency–Hopped Multilevel FSK for Mobile Radio", American Telephone and Telegraph Company, The Bell System Technical Journal, vol. 59, No. 7, Sep. 1980, pp. 1257–1275.

*Primary Examiner*—Stephen Chin
*Assistant Examiner*—Chieh M. Fan
*Attorney, Agent, or Firm*—Loeb & Loeb, LLP

[57] ABSTRACT

Frequencies (f1 to f7) are selected in respective time slots (T1 to T7) according to digital data to be transmitted. Digital data to be transmitted is indicated by a combination of frequencies selected in the respective time slots. Since a single time slot can select a plurality of frequencies, e.g., f2, f4 and f5, the total number of frequency patterns which can be achieved is increased. Therefore, since the number of combined patterns of substantially available frequencies is also increased, the number of bits of digital data which can be transmitted in a single data cycle (a period related to T1 to T7) is increased, and a transmission efficiency is improved.

8 Claims, 4 Drawing Sheets

(a) PRIMARY MODULATION MATRIX (b) HOPPING MATRIX (a) PRIMARY MODULATION MATRIX (b) HOPPING MATRIX (a) PRIMARY MODULATION MATRIX (b) HOPPING MATRIX

MULTI-CARRIER COMMUNICATION METHOD AND DEVICE

BACKGROUND OF THE INVENTION a) Field of the Invention

The invention relates to a spread spectrum communication method and a communication device adopting this method, and more particularly to a frequency hopping type spread spectrum communication method and device.

b) Description of the Related Art

A spread spectrum communication is a communication method to transmit a signal with its bandwidth spread over a bandwidth wider than the frequency bandwidth of data to be transmitted, and has advantages that it is resistive to interference, can keep signals in secrecy, and can accomplish high resolution distance measuring. In addition to fields of satellite communications, ground communications, or the like, a spread spectrum communication, is being applied to mobile and local communications with the expectation of improving frequency utilization efficiency while maintaining compatability with existing systems.

Typical methods for achieving spread spectrum communication include DS (Direct Sequence) and FH (Frequency Hopping) methods. A DS method spreads an occupied frequency bandwidth by balanced modulation of a direct spread code pulse to data modulated by a carrier wave, while an FH method utilizes a broad occupied frequency bandwidth by switching (or hopping) the carrier frequency of the modulated data according to a spread code pulse. Especially, a fast FH method switches the frequency faster than the information rate so as to be resistive against interference and to excel in distance and frequency diversity effect. This fast FH method is being marked for mobile communications and indoor communications which are heavily affected by fading.

Generally, the FH method modulates data by an FSK (Frequency Shift Keying). Specifically, data to be transmitted is converted into a codeword for every several bits, and a frequency is shifted according to the codes (codeword chip) forming the codeword. For example, data is converted into one of eight codewords for every 3 bits of input data. More specifically, when input data is "000", it is converted into a codeword "7-6-5-2-4-1-3". "0" to "1" which form the codeword are simply referred to as a code or codeword chip, and it is devised to array the codes in each codeword so that data of "000" to "111", can be classified on a receiving side.

A different frequency is allocated to the respective codes. For example, frequencies f0 to f7 correspond to codes "0" to "1", respectively. To transmit "000", according to its corresponding codeword "7-6-5-2-4-1-3", the frequencies are changed into order of "f7, f6, f5, f2, f4, f1, f3" and outputted. Since the eight types of frequencies f0 to f7 are used, modulation in this case can be 8-level MFSK (Multilevel FSK) modulation. Data modulation (modulation regardless of the frequency hopping) will be referred to as primary modulation.

The frequency of a carrier wave is hopped according to a diffusion code series (pulse train of pseudo noise code; hereinafter referred to as "code series") for frequency hopping modulation. If the number of codes contained in this code series is 31, 31 different frequencies are selected as hopping frequencies in a frequency band approved for use (the frequency hopping itself may also be said to be FSK in a broad sense, but the term FSK in this specification is used for the primary modulation only). A cycle in which the code series takes a round is referred to as a code cycle, and a cycle (1/31 of the code cycle in this case) in which the hopping frequency is switched is referred to as a hopping period. The hopping frequency is switched in synchronization with the switching of a frequency by the primary modulation.

Such an FH-MFSK method is introduced as a combination having higher affinity than the existing methods in various publications, one example being "Frequency-Hopped Multilevel FSK for Mobile Radio" by D. J. Goodman, et. al., The Bell System Technical Journal, Vol. 59, No. 7, pp. 1257–1275, 1980. A combined method of M-ary FSK which is an improved version of MFSK and FH is reported in "General Description and Basic Characteristics of Ground Mobile Frequency Hopping Type Communication Experimental Arrangement" by Eimatsu Moriyama, et. al., Quarterly Journal of Radio Research Laboratory, Vol. 32, No. 164, pp. 165–177, 1986.

A conventional MFSK and FH combined method will be described. FIG. 4 shows a conceptual diagram illustrating the allocation of carrier frequencies by the conventional MFSK+FH method.

FIG. 4 shows that 6-bit digital data is first converted into a combined pattern of seven frequencies by primary modulation. These seven frequencies have frequency patterns selected according to the 6-bit digital data, and a single carrier frequency is selected in respective time slots (T1, T2, . . . , T7). A table showing which frequency (f1, f2, . . . , f8) is selected in the respective time slots (T1 to T7) is referred to as a primary modulation matrix through this specification.

In the case of the primary modulation matrix indicated by (a) in FIG. 4, the frequency f2 is selected in time slot T1, and frequency f6 is selected in the time slot T2. Thus, the 6-bit digital data is, so to speak, coded into a combined pattern of seven frequencies by the primary modulation matrix.

Then, frequency conversion, namely spread modulation, is performed for frequency hopping (FH). This frequency hopping is performed by further spreading the frequencies f1 to f8 which were selected by the primary modulation matrix to 127 types of carrier frequencies. In this specification, a table showing diffusion is referred to as a hopping matrix. In the hopping matrix shown in FIG. 4, the horizontal axis indicates the time slots T1 to T7, while the vertical axis indicates 127 types of frequency carrier waves. These frequencies F1 to F127 are indicated with an uppercase "F" added to distinguish them from the intermediate frequencies f1 to f8.

For example, in the case shown in FIG. 4, frequency f2 is selected in time slot T1 by primary modulation. This frequency f2 is converted into frequency F4 by the hopping matrix shown in FIG. 4. The frequencies f1 to f8 undergone the primary modulation are converted into the frequencies F3 to F10 in time slot T1 as shown in the hopping matrix. Accordingly, eight boxes indicated by a heavy line in the hopping matrix correspond to the eight frequencies f1 to f8 in a single time slot of the primary modulation matrix.

Diffusion of frequencies by the hopping matrix is determined by which hopping matrix frequency (F1 to F127) the frequency f1 in a predetermined time slot is to be converted. For example, by the frequency hopping indicated by the hopping matrix shown in FIG. 4, the frequency f1 is converted into the frequency F3 in the time slot T1, F100 in the time slot T2, and F55 in the time slot T3.

As described above, the communication method, in that the primary modulation is performed by the MFSK modulation using a plurality of frequencies and the frequency hopping (diffusion modulation) is performed by the diffusion code series, uses a signal with only a single frequency in a single time slot. Therefore, improvement of the transmission efficiency is limited.

The transmission efficiency will be described with reference to the primary modulation matrix shown in FIG. 4.

By the conventional method shown in FIG. 4, the eight types of frequencies f1 to f8 can be selected in each time slot. Since these eight frequencies are selected over seven time slots, the total number of possible patterns is $8^7$ (=2,097,152). Meanwhile, since 6-bit digital data is converted into a pattern formed of these seven frequencies, the number of actually used patterns is $2^6$ (=64). Therefore, the total number of patterns is related to the number of used patterns and expressed by the following expression.

$$\text{Total number of patterns/Number of used patterns} = 8^7/2^6 = 2^{21}/2^6 = 2^{15} \quad (1)$$

Therefore, the number of patterns to be used is only $\frac{1}{2}^{15}$ the total number of patterns. In other words, the pattern of selectable frequencies is given an allowance of 15 bits.

Since the conventional communication method adopting MFSK and FH outputs only one frequency in each time slot, improvement of the transmission efficiency is limited.

SUMMARY OF THE INVENTION

In view of the above disadvantages, it is an object of the present invention to provide a communication method which can increase the number of transmission bits per time slot and improve a transmission efficiency by using a frequency hopping communication method to render the frequency of a carrier wave which can be outputted in a single time slot multiple.

A first aspect of the invention relates to a multi-carrier communication method which comprises a selecting step for selecting, on the basis of data to be transmitted, a frequency pattern consisting of a plurality of frequencies which correspond to the data, and an outputting step for outputting carrier waves of the plurality of frequencies.

Thus, since the plurality of frequencies are transmitted in correspondence with the data, a utilization efficiency of frequencies can be improved, and a transmission efficiency can be improved.

A second aspect of the invention relates to a multi-carrier frequency hopping communication method for transmitting by sequentially switching the frequency of a carrier wave at a given time period, which comprises a primary modulation step for selecting, based on data to be transmitted, N frequencies corresponding to the data and outputting information about the selected frequencies, and a diffusion modulation step for outputting carrier frequencies of N types of frequencies based on information about the N frequencies selected in the primary modulation step and information about diffusion code series for frequency hopping, N being an integer greater than or equal to 2.

Especially, since a plurality of frequencies to be hopped are selected in the frequency hopping communication, the number of bits which can be transmitted in a single data period is increased by virtue of a combination of frequency patterns.

A third aspect of the invention relates to the multi-carrier frequency hopping communication method according to the second aspect of the invention, wherein the diffusion modulation step has an N carrier diffusion modulation step for outputting carrier frequencies of N types of frequencies by modulating a signal with the selected N frequencies based on information about diffusion code series for the frequency hopping.

In the third aspect of the invention, the diffusion modulation step performs a conventional diffusion modulation based on the diffusion code series. Therefore, the conventional diffusion modulation step can be used as it is.

In order to remedy the above-described disadvantages, a fourth aspect of the invention relates to the multi-carrier frequency hopping communication method according to the second aspect of the invention, wherein the diffusion modulation step includes a waveform reading step for reading waveform information about N types of frequencies from waveform information about carrier waves of prerecorded multiple frequencies based on a signal with the selected N frequencies and information about diffusion code series for the frequency hopping, and a synthesized diffusion modulation step for outputting a signal with a synthesized waveform by synthesizing the waveform read in the waveform reading step.

In the fourth aspect of the invention, a waveform is stored for every carrier wave, and the waveforms are merely synthesized, so that a number of frequencies can be readily produced.

A fifth aspect of the invention relates to the multi-carrier frequency hopping communication method according to the second aspect of the invention, wherein the diffusion modulation step includes a synthesized diffusion modulation step for reading pertinent synthesized waveform information from information about prerecorded multiple synthesized waveforms based on a signal with the selected N frequencies and information about diffusion code series for the frequency hopping, and outputting a signal with the synthesized waveform.

In the fifth aspect of the invention, the synthesized waveforms of the respective carrier waves are stored, and the waveforms are simply read, so that a plurality of frequencies can be readily produced.

A sixth aspect of the invention relates to a multi-carrier communication device which comprises a selection unit for selecting a frequency pattern consisting of a plurality of frequencies corresponding to data to be transmitted, on the basis of the data, and an output unit for outputting carrier waves of the plurality of frequencies.

The sixth aspect of the invention is a device producing the effects of the first aspect of the invention.

A seventh aspect of the invention relates to a multi-carrier frequency hopping communication device for communicating by sequentially switching carrier frequencies at a given time period, which comprises a primary modulation unit for selecting, based on data to be transmitted, N frequencies corresponding to the data and outputting information about the selected frequencies, and a diffusion modulation device for outputting carrier frequencies of N types of frequencies based on information about the N frequencies selected by the primary modulation unit and information about diffusion code series for frequency hopping, N being an integer greater than or equal to 2.

The device of the seventh aspect of the invention produces the effects of the second aspect of the invention.

An eighth aspect of the invention relates to a multi-carrier frequency hopping communication device according to the seventh aspect of the invention, wherein the diffusion modulation unit has an N carrier diffusion modulation unit for outputting carrier frequencies of N types of frequencies by modulating a signal with the selected N frequencies based on information about diffusion code series for the frequency hopping.

The device of the eighth aspect of the invention produces the effects of the third aspect of the invention.

A ninth aspect of the invention relates to a multi-carrier frequency hopping communication device according to the seventh aspect of the invention, wherein the diffusion modulation unit includes a waveform reading unit for reading waveform information about N types of frequencies from waveform information about carrier waves of prerecorded multiple frequencies based on a signal with the selected N frequencies and information about diffusion code series for the frequency hopping, and a synthesized diffusion modulation unit for outputting a signal with a synthesized waveform by synthesizing the waveform read by the waveform reading unit.

The device of the ninth aspect of the invention produces the effects as the fourth aspect of the invention.

In order to remedy the above-described disadvantages, a tenth aspect of the invention relates to the multi-carrier frequency hopping communication device according to the seventh aspect of the invention, wherein the diffusion modulation unit includes a synthesized diffusion modulation unit for reading pertinent synthesized waveform information from waveform information about prerecorded multiple synthesized waveforms based on a signal with the selected N frequencies and information about diffusion code series for the frequency hopping, and outputting a signal with the synthesized waveform.

The device of the tenth aspect of the invention produces the effects of the fifth aspect of the invention.

DETAILED DESCRIPTION OF THE PREFERRED EMBODIMENTS

Preferred embodiments of the invention will be described with reference to the accompanying drawings.

Figure 1:
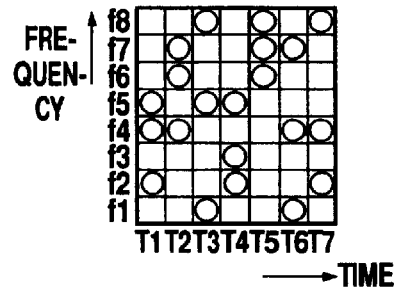
FIG. 1 is an explanatory diagram illustrating an operation principle of a multi-carrier frequency hopping communication method according to the invention.
Figure 1:
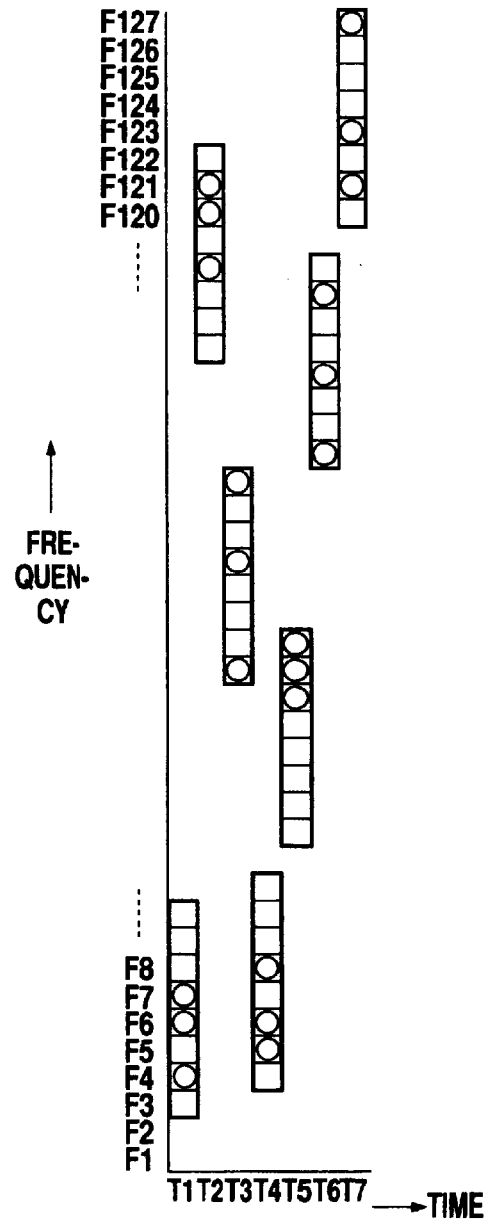

FIG. 1 is an explanatory diagram showing the principle of a multi-carrier frequency hopping communication method according to the invention. As shown in FIG. 1, digital data to be transmitted is converted into a pattern consisting of a plurality of frequencies by primary modulation by the multi-carrier frequency hopping communication method according to this embodiment. The primary modulation is shown by a primary modulation matrix as indicated by (a) in FIG. 1.

Figure 4:
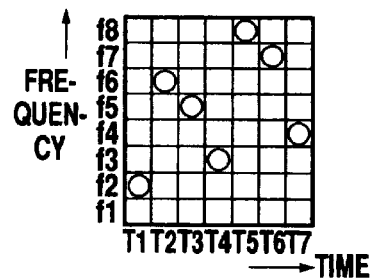
FIG. 4 is an explanatory diagram showing the operation of a communication method combining conventional MFSK and frequency hopping (FH).
Figure 4:
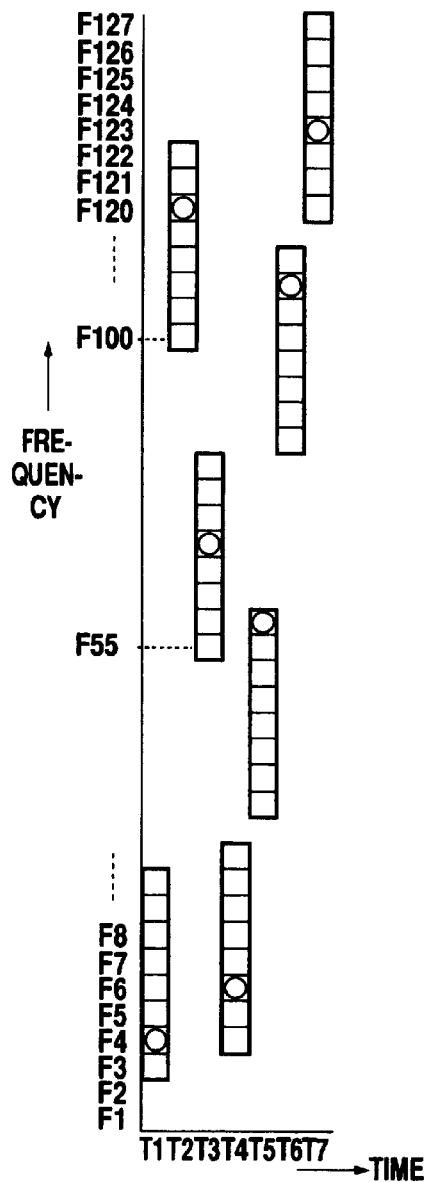

It is apparent from this primary modulation matrix and the primary modulation matrix indicated by (a) in FIG. 4 that the multi-carrier frequency hopping communication method of the invention is a communication method to output a plurality of frequencies in a single time slot.

The embodiment has a feature to select a plurality of frequencies in a single time slot. Since it is configured to select a plurality of frequencies, the number of patterns of frequencies to be adopted can be increased.

With the primary modulation matrix indicated by (a) in FIG. 1, three types of frequencies are selected in respective time slots (T1 to T7). Thus, since a plurality of frequencies are outputted in a single time slot by the multi-carrier frequency hopping communication method of this embodiment, the number of selectable frequency patterns can be increased substantially as compared with a conventional communication method. Therefore, the number of bits of digital data which can be transmitted by a single frequency pattern can be increased, and a transmission efficiency can be improved.

After converting into signals with a plurality of frequencies by the primary modulation matrix indicated by (a) in FIG. 1, the plurality of frequencies undergo a frequency hopping treatment (diffusion treatment) according to a predetermined code system in the same way as a conventional communication method. This treatment is performed on the basis of the hopping matrix indicated by (b) in FIG. 1. Diffusion by the hopping matrix is the same as the conventional hopping matrix as indicated by (b) in FIG. 4.

This multi-carrier frequency hopping communication method selects the multiple frequencies with respect to the single time slot by the primary modulation matrix, so that finally outputted hopping frequencies are present in multiple numbers in a single time slot as indicated by (b) in FIG. 1. For example, three types of carrier waves F4, F6 and F7 are outputted in time slot T1 as indicated by (b) in FIG. 1. On the other hand, the conventional frequency hopping communication method shown in FIG. 4 outputs a carrier wave with the single frequency F4 in the time slot T1.

Thus, in order to output a plurality of carrier frequencies in a single time slot, this embodiment is configured to select a plurality of frequencies by a single time slot at the time of the primary modulation of digital data. Therefore, since the number of available frequency patterns is increased and the number of frequency patterns selectable by the time slots T1 to T7 is increased, the number of bits of transmittable digital data is increased.

Improvement of transmission efficiency:

As shown by the primary modulation matrix indicated by (a) in FIG. 1, three types of frequencies can be selected in a single time slot by the primary modulation matrix according to this embodiment. As a result, the total number of frequency patterns selectable in one data cycle (a period of time slots T1 to T7) is increased. Consequently, the number of available frequency patterns is also increased, and the number of transmission bits per time slot is expected to increase.

Descriptions will be made of the number of bits of transmittable digital data when three frequencies are selected in a single time slot as shown by the primary modulation matrix as indicated by (a) in FIG. 1.

Since three types of frequencies are first selected from eight types of frequencies in a single time slot, the number of possible combinations thereof is $(_8C_3)^7=56^7$. The number of available patterns is calculated from this total pattern number of $56^7$ with an allowance of 15 bits provided in the same way as the conventional communication method shown in FIG. 4. In other words, patterns of $\frac{1}{2}^{15}$ of the total number of patterns were actually used by the conventional communication method shown in FIG. 4. In this embodiment, it is appropriate to adopt the same allowance of bits in view of making a comparison with the conventional communication method.

Then, since the total number of patterns is $(56^7)$ in this embodiment, the number of available patterns becomes $(56^7)/(2^{15})=2^5 \times 7^7$. And, $2^5 \times 7^7$ is equal to or more than $2^{25}$, then digital data of about 25 bits or more can be transmitted in one cycle under the conditions with the same allowance of bits as the conventional communication method.

As described above, this embodiment is configured in a different way from the conventional MFSK so that a plurality of frequencies can be selected in a single time slot. Therefore, the total number of frequency patterns in a single data cycle (a period of time slots T1 to T7) can be increased. As a result, the number of available patterns can be increased. Also, the number of bits of digital data transmittable in a single data cycle can be increased, and a transmission efficiency can be improved extensively.

Since three types of frequencies are selected in a single time slot in the embodiment shown in FIG. 1, the number of bits transmittable in a single data cycle (a period of time slots T1 to T7) is increased to about 25 bits, more than 4 times the 6 bits of the conventional method as described above. However, the number of frequencies selectable in a single time slot can itself be another numerical value. For example, when it is assumed that the number of frequencies selectable in a single time slot is four, the total number of patterns can be increased further. Since, it can be confirmed by the same calculation as described above that when the number of frequencies selected in a single time slot is determined to be two, the number of bits of transmittable digital data grows by a factor of three.

As shown in FIG. 1, this embodiment selects multiple frequencies in a single time slot by the primary modulation in order to output carrier waves for the multiple frequencies in the single time slot and uses the conventional communication method as it is "in principle" to perform diffusion modulation (frequency hopping). But, it is thought that the same effects can be obtained by selecting only one frequency in a single time slot by the primary modulation in the same way as the conventional communication method and dispersing to a plurality of frequencies by the diffusion modulation. However, it is thought that the structure configured as described above is somewhat hard to establish synchronization by the frequency hopping communication method. Therefore, for convenience in configuring the device, it is preferably configured to select previously a plurality of frequencies in a single time slot by the primary modulation as shown by the primary modulation matrix indicated by (a) in FIG. 1.

Configuration of transmitter and receiver:

Descriptions will be made of the structures of a transmitter and a receiver which adopt the principle of the communication method of the above-described embodiment with reference to the drawings.

Figure 2:
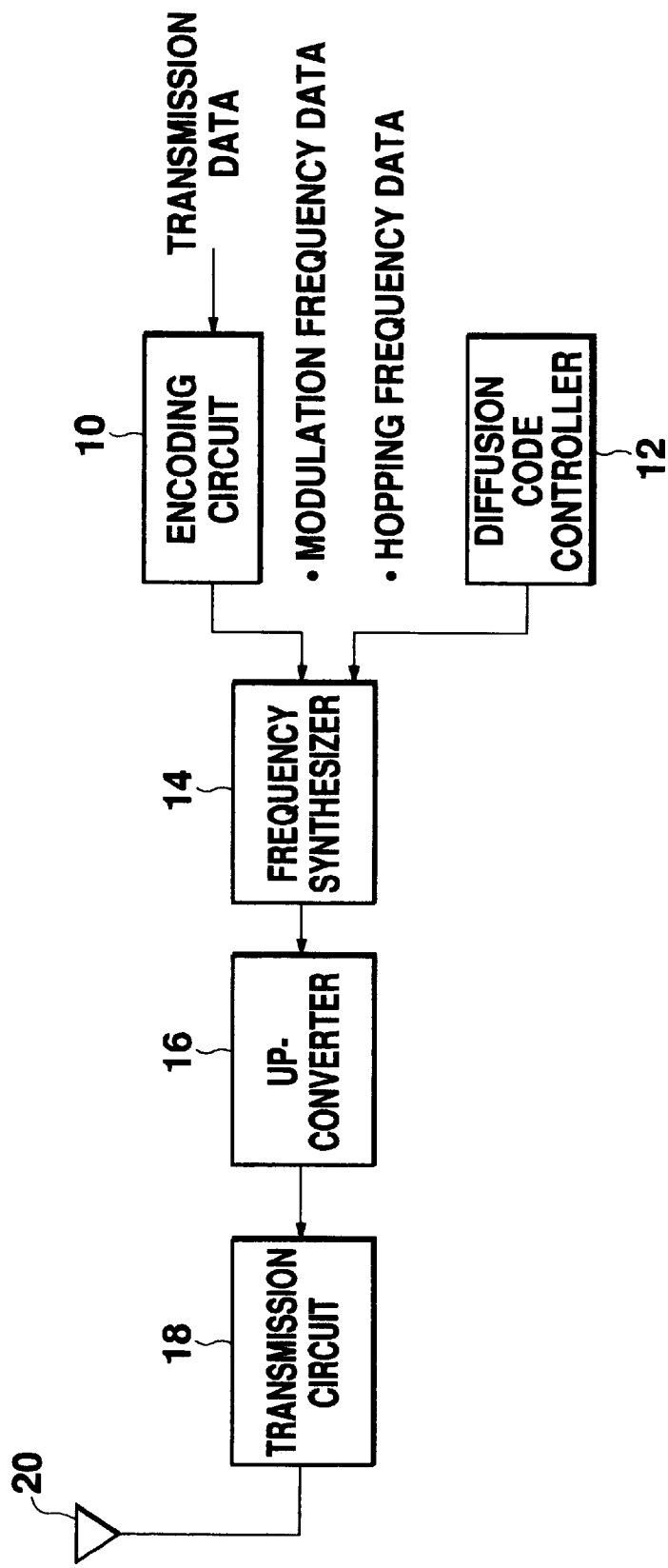
FIG. 2 is a block diagram showing the structure of a transmitter adopting the multi-carrier frequency hopping communication method according to the invention.

FIG. 2 is a block diagram showing the structure of a transmitter which adopts the communication method of the invention. It is seen from FIG. 2 that digital data to be transmitted is converted by an encoding circuit into the frequency pattern shown by the primary modulation matrix as indicated by (a) in FIG. 1. This frequency pattern is converted into a single frequency pattern on a 25-bit basis. This encoding circuit 10 outputs three types of modulation frequency data for every time slot T1 ... T7. For example, the encoding circuit 10 outputs signals indicating three frequencies f4, f6 and f7 in the time slot T2. Since eight types of frequencies f1 to f8 can be outputted, the modulation frequency data outputted by the encoding circuit 10 includes three 3-bit digital data indicating any frequency from f1 to f8. This encoding circuit 10 can have various structures if it can convert 25-bit digital data into patterns each having three frequencies in the time slots T1 to T7. For example, a predetermined encoding circuit having a feedback shift register is preferably used, and it may also be configured to convert 25-bit digital data into a frequency pattern by simply storing a conversion table into a memory and referring to this conversion table stored in the memory. This conversion is nothing but encoding of digital data, but a Reed-Solomon code or the like is suitably used as an actual method for encoding.

The transmitter shown in FIG. 2 is provided with a diffusion code controller 12 to produce diffusion codes for frequency hopping. The diffusion code controller 12 outputs hopping frequency data for controlling the frequency hopping, and in the embodiment shown in FIG. 1, 127 types of frequency data F1 to F127 are outputted in every time slot. Specifically, this hopping frequency data is 7-bit digital data which represents one of the frequencies F1 to F127.

Modulation frequency data outputted by the encoding circuit 10 and hopping frequency data outputted by the diffusion code controller 12 are supplied to a frequency synthesizer 14. This frequency synthesizer 14 is a synthesizer which outputs three types of final carrier frequencies on the basis of the hopping frequency data and three modulation frequency data. In the functional view, the frequency synthesizer adds each of three modulation frequency data and hopping frequency data to output three types of carrier frequencies. For example, in the embodiment shown in FIG. 1, the encoding circuit 10 outputs three types of modulation frequency data f2, f4 and f5 in time slot T1. And, the diffusion code controller 12 outputs hopping frequency data F3 in the time slot T1. The frequency synthesizer 14 adds the hopping frequency data F3 and each of f2, f4 and f5 in order to output carrier frequencies F4, F6 and F7. In practice, it is suitable to use a DDS (Direct Digital Synthesizer) as the frequency synthesizer 14. This DDS stores the waveforms of the frequencies F1 to F127 into a memory (wave memory) and reads from the memory waveforms corresponding to the three types of frequencies (e.g., F4, F6 and F7) calculated. The waveform data read from the memory is synthesized to output analog signals containing three types of carrier waves. The DDS keeps the waveforms of synthesized frequencies corresponding to required combinations in a memory (wave memory) at frequencies F1 to F127, reads from the memory the synthesized carrier waveforms corresponding to the calculated three types of frequencies (e.g., F4, F6 and F7), and outputs the selected values. The carrier waves containing the three types of frequencies outputted by the frequency synthesizer 14 have their frequencies converted by an up-converter 16 into the frequency band of a predetermined wave to correspond to the frequency band which can be used finally by the transmitter.

The output signal from the up-converter 16 is power-amplified to a signal having a desired intensity by a transmission circuit 18 and emitted into the air from an antenna 20.

Thus, since the DDS is used as the frequency synthesizer 14 in this embodiment, the multi-carrier frequency hopping communication method shown in FIG. 1 can be achieved quite easily.

Now, the structure of a receiver which adopts the multi-carrier frequency hopping communication method according to this embodiment will be described with reference to the drawings.

Figure 3:
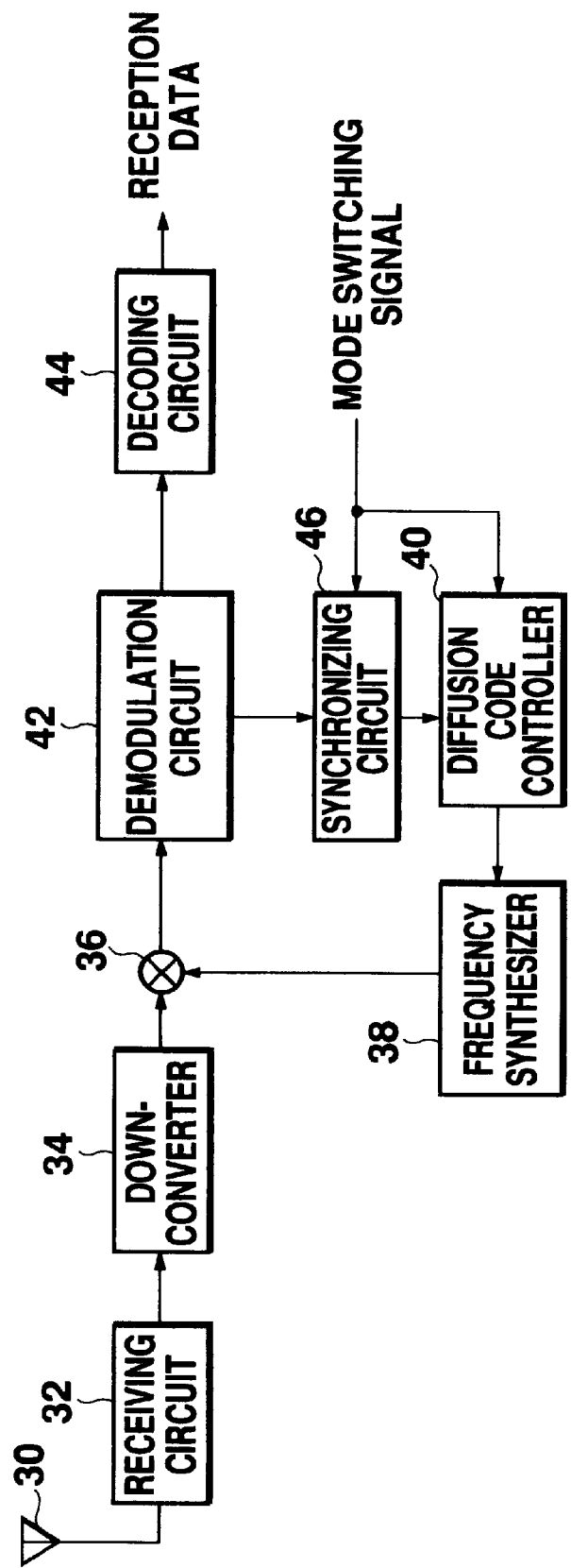
FIG. 3 is a block diagram showing the structure of a receiver adopting the multi-carrier frequency hopping communication method according to the invention.

FIG. 3 is a block diagram showing the structure of a receiver which demodulates after receiving a plurality of carrier frequencies by the multi-carrier frequency hopping communication method described with reference to FIG. 1.

First, an antenna 30 receives a radio wave containing a plurality of frequencies, and a receiving circuit 32 detects carrier waves for such multiple frequencies. Prior to demodulation, a down-converter 34 converts the detected multiple frequencies into frequencies at which demodulation can be readily performed. The receiving circuit 32 and the down-converter 34 operate contrary to the transmission circuit 18 and the up-converter 16. The output signal from the down-converter 34 is a signal with any one of the frequencies F1 to F127 shown by the hopping matrix indicated by (b) in FIG. 1. Reverse-diffusion modulation (reverse-frequency hopping) is performed on the frequencies F1 to F127 and multiplied with the output signal from a frequency synthesizer 38 by a multiplier 36 in order to convert them into the frequencies f1 to f8 shown by the primary modulation matrix indicated by (a) in FIG. 1. This frequency synthesizer 38 is also a DDS or the like as in the case of the frequency synthesizer 14 shown in FIG. 2 and outputs a hopping frequency for every time slot on the basis of the hopping frequency data outputted from a diffusion code controller 40. The diffusion code controller 40 shown in FIG. 3 outputs the hopping frequency data based on the same code series as in the case of the diffusion code controller 12 shown in FIG. 2.

The output signal from the multiplier 36 becomes a signal so that any three frequencies among the eight frequencies f1 to f8 shown by the primary modulation matrix indicated by (a) in FIG. 1 are outputted in every time slot. A demodulation circuit 42 detects which three frequency signals are contained in the output signal from the multiplier 36. These three detected frequency signals are outputted as converted three 3-bit digital signals. These three 3-bit digital signals (9 bits in total) indicate three carrier frequencies as in the case of the output signal from the encoding circuit 10 shown in FIG. 2.

A decoding circuit 44 operates contrary to the encoding circuit 10 shown in FIG. 2. The decoding circuit 44 collects the three 3-bit digital signals in time slots T1 to T7 and forms a frequency pattern in the data cycle (time slots T1 to T7), while 25-bit digital data is decoded from the frequency pattern.

Specifically, various methods can be adopted to decode the 25-bit digital data from the frequency pattern as described with reference to FIG. 2. For example, a conversion table for converting from the frequency pattern to the 25-bit digital data may be stored in a memory.

As shown in FIG. 3, this receiver is characterized by having a decoding circuit 44 which converts a predetermined frequency pattern into 25-bit digital data and a demodulation circuit 42 which can demodulate respective carrier waves even when a single time slot includes a plurality of frequency carrier waves. Thus, the receiver according to the multi-carrier frequency hopping communication method of the invention has a characteristic structure.

A synchronizing circuit 46 is disposed for synchronization in the frequency hopping as shown in FIG. 3. This synchronizing circuit 46 has the same structure as the synchronizing circuit of the receiver according to a conventional frequency hopping communication method. And, as in the case of the receiver according to the conventional frequency hopping communication method, the synchronizing circuit 46 and the diffusion code controller 40 operate in the same way as the conventional method, according to whether synchronization is being taken or the established synchronization is being maintained in response to a mode switching signal from outside. Such synchronizing operation is not be described because it is not directly related with the present invention.

As described above, according to the first aspect of the invention, a plurality of frequency signals corresponding to data are outputted as carrier wave in order to transmit the data, so that the number of frequency patterns is increased as compared with the conventional MFSK method which outputs only a single frequency signal at a time. Thus, it can provide a communication method having an improved transmission efficiency.

The second aspect of the invention can achieve a frequency hopping communication method which adopts a plurality of carrier waves and can provide a frequency hopping communication method having an improved transmission efficiency.

The third aspect of the invention performs diffusion modulation of N frequency signals according to data to be transmitted by the hopping frequency, so that it can provide a frequency hopping communication method which can use a conventional diffusion modulation method with no modification.

The fourth aspect of the invention reads a signal waveform from those previously stored according to N frequency signals and information about diffusion code series and synthesizes the signal waveform. Therefore, it provides a frequency hopping communication method which can form a precise signal waveform even when the number of frequencies forming a frequency pattern is increased.

The fifth aspect of the invention reads and outputs a synthesized carrier waveform from those previously stored according to N frequency signals and information about diffusion code series. Therefore, a plurality of carrier frequencies can be outputted simultaneously by a single waveform reading circuit.

The sixth to tenth aspects of the invention are devices which have substantially the same effects as the first to fifth aspects of the invention.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A multi-carrier frequency hopping communication method for transmitting by sequentially switching the frequency of a carrier wave at a given time period, which comprises:

a primary modulation step for selecting, based on data to be transmitted, N frequencies corresponding to the data and outputting information about the selected frequencies; and a diffusion modulation step for simultaneously outputting carrier frequencies of N types of frequencies based on information about the N frequencies selected in the primary modulation step and information about diffusion code series for frequency hopping, where N is an integer 2 or more.

2. The multi-carrier frequency hopping communication method according to claim 1, wherein the diffusion modulation step has an N carrier diffusion modulation step for outputting carrier frequencies of N types of frequencies by modulating a signal with the selected N frequencies based on information about diffusion code series for the frequency hopping.

3. The multi-carrier frequency hopping communication method according to claim 1, wherein the diffusion modulation step includes:

a waveform reading step for reading waveform information about N types of frequencies from waveform information about carrier waves of prerecorded multiple frequencies based on a signal with the selected N frequencies and information about diffusion code series for the frequency hopping; and a synthesized diffusion modulation step for outputting a signal with a synthesized waveform by synthesizing the waveform read in the waveform reading step.

4. The multi-carrier frequency hopping communication method according to claim 1, wherein the diffusion modulation step includes:

a synthesized diffusion modulation step for reading pertinent synthesized waveform information from information about prerecorded multiple synthesized waveforms based on a signal with the selected N frequencies and information about diffusion code series for the frequency hopping, and outputting a signal with the synthesized waveform, wherein:

the synthesized waveform information is information about N types of frequencies synthesized.

5. A multi-carrier frequency hopping communication device for transmitting by sequentially switching carrier frequencies at a given time period, which comprises:

a primary modulation unit for selecting, based on data to be transmitted, N frequencies corresponding to the data and outputting information about the selected frequencies; and a diffusion modulation device for simultaneously outputting carrier frequencies of N types of frequencies based on information about the N frequencies selected by the primary modulation unit and information about diffusion code series for frequency hopping, where N is an integer 2 or more.

6. The multi-carrier frequency hopping communication device according to claim 5, wherein the diffusion modulation unit has an N carrier diffusion modulation unit for outputting carrier frequencies of N types of frequencies by modulating a signal with the selected N frequencies based on information about diffusion code series for the frequency hopping.

7. The multi-carrier frequency hopping communication device according to claim 5, wherein the diffusion modulation unit includes:

a waveform reading unit for reading waveform information about N types of frequencies from waveform information about carrier waves of prerecorded multiple frequencies based on a signal with the selected N frequencies and information about diffusion code series for the frequency hopping; and a synthesized diffusion modulation unit for outputting a signal with a synthesized waveform by synthesizing the waveform read by the waveform reading unit.

8. The multi-carrier frequency hopping communication device according to claim 5, wherein the diffusion modulation unit includes a synthesized diffusion modulation unit for reading pertinent synthesized waveform information from information about prerecorded multiple synthesized waveforms based on a signal with the selected N frequencies and information about diffusion code series for the frequency hopping, and outputting a signal with the synthesized waveform, wherein:

the synthesized waveform information is information about N types of frequencies synthesized.

* * * * *